US011975390B2

(12) United States Patent
Takata et al.

(10) Patent No.: US 11,975,390 B2
(45) Date of Patent: May 7, 2024

(54) METHOD FOR PRODUCING INDIUM TIN OXIDE PARTICLES AND METHOD FOR PRODUCING CURABLE COMPOSITION

(71) Applicant: FUJIFILM CORPORATION, Tokyo (JP)

(72) Inventors: Masahiro Takata, Kanagawa (JP); Atsushi Tanaka, Kanagawa (JP)

(73) Assignee: FUJIFILM CORPORATION, Tokyo (JP)

( * ) Notice: Subject to any disclaimer, the term of this patent is extended or adjusted under 35 U.S.C. 154(b) by 480 days.

(21) Appl. No.: 17/169,563

(22) Filed: Feb. 8, 2021

(65) Prior Publication Data
US 2021/0162500 A1    Jun. 3, 2021

Related U.S. Application Data

(63) Continuation of application No. PCT/JP2019/030028, filed on Jul. 31, 2019.

(30) Foreign Application Priority Data

Aug. 22, 2018 (JP) .................................. 2018-155643

(51) Int. Cl.
B22F 9/16 (2006.01)
C08F 20/18 (2006.01)
C08K 3/22 (2006.01)

(52) U.S. Cl.
CPC ................ B22F 9/16 (2013.01); C08F 20/18 (2013.01); B22F 2302/25 (2013.01); C08K 2003/2231 (2013.01)

(58) Field of Classification Search
CPC ........ B22F 9/16; B22F 2302/25; C08F 20/18; C08K 2003/2231
See application file for complete search history.

(56) References Cited

U.S. PATENT DOCUMENTS 4,594,182 A * 6/1986 Hashimoto .......... C01G 15/003
252/519.3
6,153,711 A * 11/2000 Towns .................... C08G 61/02
526/75

(Continued)

FOREIGN PATENT DOCUMENTS

| JP | 2015-003940 A | 1/2015 |
| JP | 2015-168582 A1 | 9/2015 |
| WO | 2017/014313 A1 | 1/2017 |

OTHER PUBLICATIONS

Peng Tao, et.al. ["Preparation and Optical Properties of Indium Tin Oxide/Epoxy Nanocomposites with Polyglycidyl Methacrylate Grafted Nanoparticles" ACS Appl. Mater. Interfaces 2011, 3, 3638-3645]. (Year: 2011).*

(Continued)

*Primary Examiner* — Brian D Walck
*Assistant Examiner* — Nazmun Nahar Shams
(74) *Attorney, Agent, or Firm* — SOLARIS Intellectual Property Group, PLLC

(57) ABSTRACT

Provided are a method for producing indium tin oxide particles and a method for producing a curable composition, the methods including a step of obtaining a precursor solution including indium and tin by heating indium acetate and tin acetate in a solvent including a carboxylic acid and having 6 to 20 carbon atoms, and a step of obtaining a reaction solution including indium tin oxide particles by dropwise adding the obtained precursor solution to a solvent having a hydroxy group and having 14 to 22 carbon atoms, which has a temperature of 230° C. to 320° C., in which an acetic acid concentration in the precursor solution is in a range of 0.5% by mass to 6% by mass.

9 Claims, 2 Drawing Sheets

(56) References Cited

U.S. PATENT DOCUMENTS 9,517,945 B2 * 12/2016 Ito .......................... C01G 1/02
2015/0259217 A1 9/2015 Ito et al.
2018/0371638 A1 12/2018 Novet et al.

OTHER PUBLICATIONS

International Search Report issued in International Application No. PCT/JP2019/030028 dated Oct. 8, 2019.
Written Opinion of the ISA issued in International Application No. PCT/JP2019/030028 dated Oct. 8, 2019.

* cited by examiner

METHOD FOR PRODUCING INDIUM TIN OXIDE PARTICLES AND METHOD FOR PRODUCING CURABLE COMPOSITION

CROSS-REFERENCE TO RELATED APPLICATIONS

This application is a continuation application of International Application No. PCT/JP2019/030028, filed Jul. 31, 2019, the disclosure of which is incorporated herein by reference in its entirety. Further, this application claims priority from Japanese Patent Application No. 2018-155643, filed Aug. 22, 2018, the disclosure of which is incorporated herein by reference in its entirety.

BACKGROUND OF THE INVENTION

1. Field of the Invention

The present disclosure relates to a method for producing indium tin oxide particles and a method for producing a curable composition.

2. Description of the Related Art

Indium tin oxide particles (hereinafter, sometimes referred to as "ITO particles") can be used for various uses. Among these, ITO particles having a high absorbance in a near infrared region are useful for forming an optical material such as a diffraction grating lens and an infrared filter, and can achieve a composite material having a low Abbe number.

Therefore, various methods for producing ITO particles having absorption in a near infrared region at a wavelength of 1900 nm or less have been studied.

For example, as a method for producing metal oxide particles including a plurality of metal species at low temperature, a method for producing metal oxide nanoparticles by preparing a solution including a carboxylic acid metal salt and a carboxylic acid and dropwise adding the obtained solution to an alcohol at a temperature of 250° C. or lower to react is suggested (refer to the specification of US2015/0259217A).

SUMMARY OF THE INVENTION

Nanosized metal oxide particles such as ITO particles can be produced by the method described in the specification of US2015/0259217A.

However, the method specifically described in the specification of US2015/0259217A as a suitable producing method is a method for obtaining particles by adjusting a dropping rate of a precursor solution including a metal oxide to 0.5 mL (milliliter)/minute or less to cause a particle formation reaction and maintaining a reaction temperature in the liquid for 30 minutes, and since the dropping rate is slow, it takes a long time to synthesize the ITO particles. For example, in a case where the total amount of the precursor solution added dropwise is 500 mL, at least 16 hours is required for the synthesis, and it is not practical to apply the method described in this reference to the industrial scale.

In addition, there is no focus in the specification of US2015/0259217A on a method for producing the precursor solution.

As the result of study focused on a method for preparing a precursor solution to be used in an ITO particles formation reaction, the present inventors have found that, in a case where indium acetate and tin acetate are used as metal precursor and dissolved in carboxylic acid to prepare a precursor solution, the obtained precursor solution may thicken or be cloudy over time depending on conditions.

In a case where the precursor solution thickens, it has been found that, in a case where the precursor solution is used for the ITO particles formation reaction, it may be difficult to drop the precursor solution, or physical properties of obtained ITO particles may deteriorate due to the cloudy precursor solution.

An object to be achieved by an embodiment of the present invention is to provide a method for producing indium tin oxide particles, which is capable of, by using a precursor solution having excellent storage stability, efficiently and stably producing indium tin oxide particles having absorption in a near infrared region.

An object to be achieved by another embodiment of the present invention is to provide a method for efficiently and stably producing a curable composition which includes indium tin oxide particles having absorption in a near infrared region, has a low Abbe number, and is useful for use of an optical material.

The methods for achieving the above-described objects include the following aspects.

<1> A method for producing indium tin oxide particles, the method comprising:
  a step of obtaining a precursor solution including indium and tin by heating indium acetate and tin acetate in a solvent including a carboxylic acid and having 6 to 20 carbon atoms; and
  a step of obtaining a reaction solution including indium tin oxide particles by dropwise adding the obtained precursor solution to a solvent having a hydroxy group and having 14 to 22 carbon atoms, which has a temperature of 230° C. to 320° C.,
  in which an acetic acid concentration in the precursor solution is in a range of 0.5% by mass to 6% by mass.

<2> The method for producing indium tin oxide particles according to <1>,
  in which a viscosity of the precursor solution at 25° C. is 0.14 Pa·s or less.

<3> The method for producing indium tin oxide particles according to <1> or <2>,
  in which, in the step of obtaining a reaction solution including the indium tin oxide particles, the precursor solution is added dropwise at a dropping rate of 1.0 mL/min or more.

<4> The method for producing indium tin oxide particles according to any one of <1> to <3>,
  in which a total molar concentration of metals included in the precursor solution is 0.1 mmol/mL or more.

<5> The method for producing indium tin oxide particles according to any one of <1> to <4>,
  in which, in a case where a content of the hydroxy group included in the solvent having a hydroxy group and having 14 to 22 carbon atoms is denoted by A mol, and a content of the carboxylic acid included in the precursor solution and having 6 to 20 carbon atoms is denoted by B mol, A and B satisfy a condition of Expression (I), $$B/(A+B)<0.5 \qquad \text{Expression (I).}$$

<6> The method for producing indium tin oxide particles according to any one of <1> to <5>,
  in which the carboxylic acid having 6 to 20 carbon atoms includes oleic acid.

<7> The method for producing indium tin oxide particles according to any one of <1> to <6>, in which the solvent having a hydroxy group and having 14 to 22 carbon atoms includes oleyl alcohol.

<8> A method for producing a curable composition, the method comprising:
   a step of obtaining indium tin oxide particles by the method for producing indium tin oxide particles according to any one of <1> to <7>; and
   a step of obtaining a curable composition having absorption in a near infrared region by mixing the obtained indium tin oxide particles and a polymerizable compound.

According to an embodiment of the present invention, it is possible to provide a method for producing indium tin oxide particles, which is capable of, by using a precursor solution having excellent storage stability, efficiently and stably producing indium tin oxide particles having absorption in a near infrared region.

According to another embodiment of the present invention, it is possible to provide a method for efficiently and stably producing a curable composition which includes indium tin oxide particles having absorption in a near infrared region, has a low Abbe number, and is useful for use of an optical material.

DESCRIPTION OF THE PREFERRED EMBODIMENTS

Figure 1:
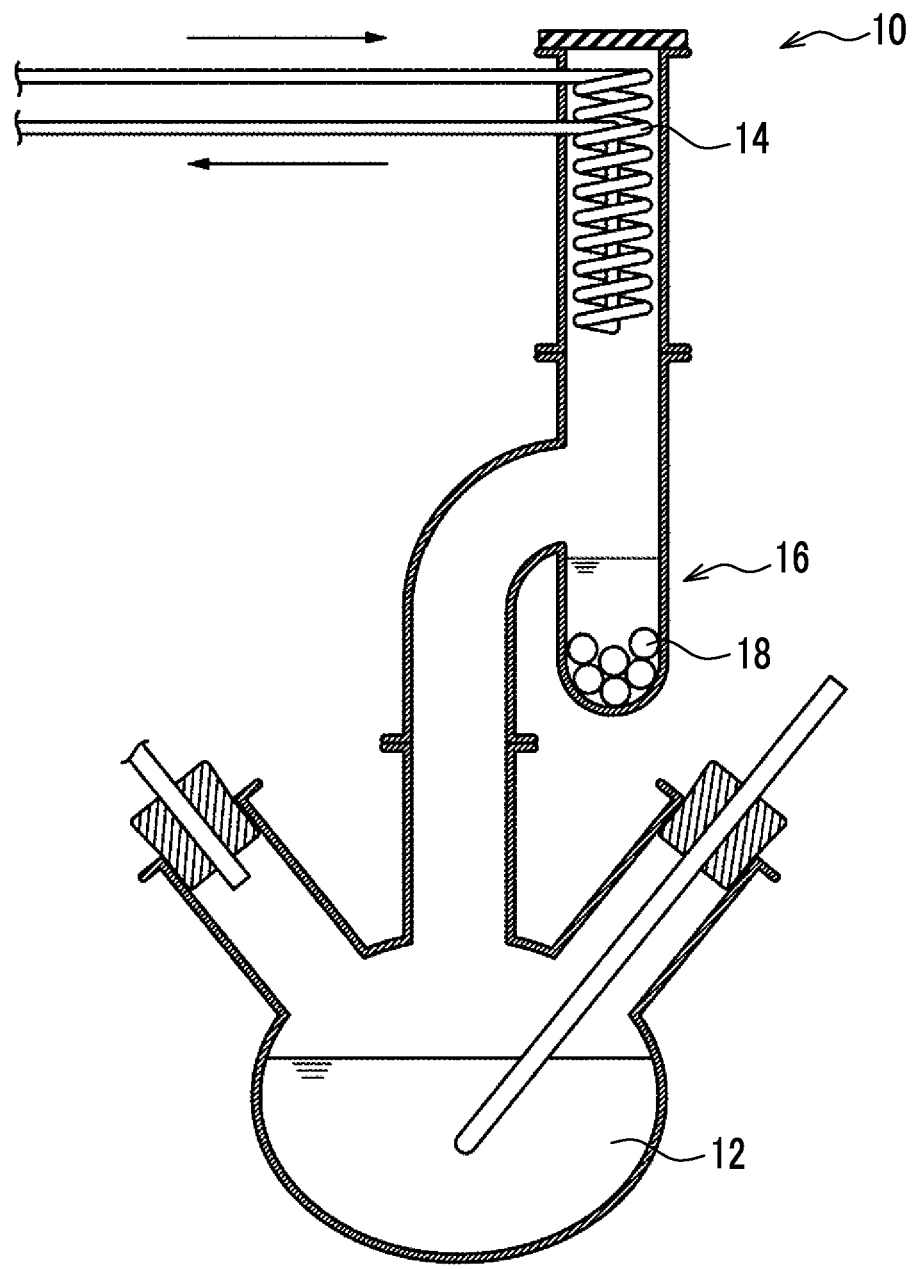
FIG. 1 is a schematic configuration diagram showing an example of a reactor which includes a Dean Stark trap and is used for preparing a precursor solution.

Hereinafter, the contents of the present disclosure will be described.

The description of constituent elements below is made based on representative embodiments of the present disclosure, but the present disclosure is not limited to the following embodiments.

In the present disclosure, a numerical range described by using "to" represents a numerical range including numerical values before and after "to" as a lower limit value and an upper limit value.

In the present disclosure, in a case where a plurality of substances corresponding to each component in a composition is present, the amount of each component in the composition means the total amount of the plurality of substances present in the composition, unless otherwise specified.

In a numerical range described in a stepwise manner in the present disclosure, an upper limit value or a lower limit value described in a certain numerical range may be replaced with an upper limit value or a lower limit value in another numerical range described in a stepwise manner. In addition, in a numerical range described in the present disclosure, an upper limit value or a lower limit value described in a certain numerical range may be replaced with a value described in Examples.

In addition, in the present disclosure, a combination of two or more preferred aspects is a more preferred aspect.

Unless otherwise specified, a description for a group (atomic group) in the present disclosure is used in a meaning including an unsubstituted group and a group having a substituent. For example, "alkyl group" is used in a meaning including both of an alkyl group (unsubstituted alkyl group) having no substituent and an alkyl group (substituted alkyl group) having a substituent. The same applies to other groups.

In addition, in the present disclosure, "(meth)acrylic" represents both or either of acrylic and methacrylic, and "(meth)acrylate" represents both or either of acrylate and methacrylate.

In the present disclosure, the term "step" includes not only the independent step but also a step in which intended purposes are achieved even in a case where the step cannot be precisely distinguished from other steps.

<Method for Producing ITO Particles>

A method for producing ITO particles (hereinafter, sometimes simply referred to as a "producing method") according to an embodiment of the present disclosure includes a step (step (I)) of obtaining a precursor solution including indium and tin by heating indium acetate and tin acetate in a solvent including a carboxylic acid and having 6 to 20 carbon atoms, and a step (step (II)) of obtaining a reaction solution including indium tin oxide particles by dropwise adding the obtained precursor solution to a solvent having a hydroxy group and having 14 to 22 carbon atoms, which has a temperature of 230° C. to 320° C., in which an acetic acid concentration in the precursor solution of the step (I) is in a range of 0.5% by mass to 6% by mass.

According to the producing method according to the embodiment of the present disclosure, since the acetic acid concentration in the precursor solution of the step (I) is in a range of 0.5% by mass to 6% by mass, temporal stability of the precursor solution is good. Specifically, the viscosity of the precursor solution is maintained in a range in which the precursor solution is easily added dropwise to the solvent of the step (II), and even in a case where the precursor solution once prepared is aged, an undesired increase in viscosity and precipitation of insoluble matters are suppressed. Therefore, by using the precursor solution obtained in the step (I), it is possible to efficiently and stably produce ITO particles having good absorption in a near infrared region.

The effect of the producing method according to the embodiment of the present disclosure is not clear, but assumed as follows.

In the step (I), in a case of preparing a precursor solution including a carboxylic acid metal salt, indium acetate and tin acetate are dissolved, under heating conditions, in a solvent including a carboxylic acid and having 6 to 20 carbon atoms, for example, in a case where oleic acid is used as the carboxylic acid, in a solvent including oleic acid. By dissolving indium acetate and tin acetate, indium oleate and tin oleate are respectively produced. Acetic acid separated from indium acetate and tin acetate is normally removed from the system or returned to the solvent.

According to the study by the present inventors, in a case where the amount of acetic acid remaining in the system exceeds 6% by mass, it has been found that, as the temperature of the system decreases, precipitates may be formed in the system, which causes a phenomenon in which the reaction solution is cloudy. It is considered that the phenomenon in which precipitates are formed in the system suggests that acetic acid is recoordinated to the dissolved indium or tin. In addition, the precipitated indium or tin forms colloidal fine particles, which are not redissolved even in a case of being heated. In a case where the precursor solution including the precipitated colloidal particles is used in a formation reaction of ITO particles, the characteristics of the precursor solution are not stable, and defects are likely to occur in the formed ITO particles or plasmon resonance peaks of the obtained ITO particles tend to vary.

On the other hand, it has been considered that complete removal of acetic acid from the system is effective in suppressing the undesired side reactions described above. However, in a case where the content of acetic acid in the reaction solution is less than 0.5% by mass, and further, in a case where acetic acid is completely removed from the reaction solution system, it has been found that the viscosity of the precursor solution significantly increases over time, and the precursor solution with increased viscosity is difficult to be added dropwise in a case of being used to the subsequent ITO particles formation reaction.

By including an appropriate amount of acetic acid in the precursor solution, stability of the generated indium oleate and tin oleate is improved, and it is assumed that an undesired increase in viscosity of the precursor solution and formation of precipitates are suppressed and a precursor solution having good temporal stability can be obtained.

By using a precursor solution which stably includes indium oleate and tin oleate and has good viscosity stability, it is considered that, in the subsequent formation of ITO particles, the precursor solution can be stably added dropwise and the obtained ITO particles are uniform and have good physical properties.

According to the producing method according to the embodiment of the present disclosure, uniformity and stability of the precursor solution are good, and in a case where the precursor solution is prepared in advance and the ITO particles formation reaction is performed using the precursor solution obtained after a lapse of time, dropping property is good. Good dropping property is particularly effective in improving the dropping rate of the precursor solution. Therefore, according to the producing method according to the embodiment of the present disclosure, ITO particles can be produced stably and efficiently.

Furthermore, since the occurrence of undesired defects is suppressed and good absorption in the near infrared region is obtained, the ITO particles obtained by the producing method according to the embodiment of the present disclosure achieves a low Abbe number by applying to a diffraction grating lens and the like. Therefore, in a case where the ITO particles obtained by the producing method according to the embodiment of the present disclosure are applied to the diffraction grating lens, since the height of the diffraction grating can be lowered, it is possible to obtain an effect of reducing flare. Furthermore, it is considered that the ITO particles obtained by the producing method according to the embodiment of the present disclosure are also useful for use of filter in the near infrared region.

The present disclosure is not limited to the assumed mechanism.

Hereinafter, the producing method according to the embodiment of the present disclosure will be described in the order of steps.

[Step (I)]

The step (I) is a step of obtaining a precursor solution including indium and tin by heating indium acetate and tin acetate in a solvent including a carboxylic acid and having 6 to 20 carbon atoms. In the step (I), the acetic acid concentration in the precursor solution is controlled in a range of 0.5% by mass to 6% by mass.

(Indium Acetate and Tin Acetate)

As an indium raw material and a tin raw material used for preparing the precursor solution, indium acetate and tin acetate are used.

From the viewpoint of stability, handleability, supply stability, and cost, indium acetate is a preferred raw material as the indium raw material.

Tin acetate as the tin raw material is selected from the group consisting of tin (II) acetate and tin (IV) acetate. Tin (II) acetate and tin (IV) acetate are preferred raw materials from the viewpoint of stability, handleability, supply stability, and cost, and among these tin (IV) acetate is more preferable.

In a case of heating in a solvent including a carboxylic acid and having 6 to 20 carbon atoms, indium acetate and tin acetate as raw materials are easily dissolved in the solvent. Therefore, it is possible to easily obtain a precursor solution including a precursor in which the carboxylic acid having 6 to 20 carbon atoms is coordinated to indium and tin.

Among these, from the viewpoint of raw material cost, purity, stability, handleability, easiness of forming the precursor solution, and the like, it is preferable to use indium acetate and tin (IV) acetate.

(Solvent Used for Preparing Precursor Solution)

As the solvent for preparing the precursor solution, an organic acid including a carboxylic acid having 6 to 20 carbon atoms is used.

The number of carbon atoms in the carboxylic acid of the organic acid including a carboxylic acid is 6 to 20, preferably 14 to 20.

A hydrocarbon group in the carboxylic acid may be linear, may have a branch, or may have a ring structure as long as the hydrocarbon group has the above-described range of carbon atoms.

Among these, an unsaturated fatty acid is preferable as the carboxylic acid.

Specific examples of the carboxylic acid having 6 to 20 carbon atoms include organic acids such as caproic acid, caprylic acid, pelargonic acid, 2-ethylhexanoic acid, capric acid, undecanoic acid, lauric acid, myristic acid, palmitic acid, stearic acid, palmitoleic acid, oleic acid, linoleic acid, and linolenic acid. As the solvent for preparing the precursor solution, it is preferable to use one or more organic acids selected from the group consisting of the above-described organic acids, it is more preferable to use one or more organic acids selected from the group consisting of caproic acid, caprylic acid, oleic acid, linoleic acid, and linolenic acid, and it is still more preferable that the solvent includes oleic acid.

Any of the above-described solvents can easily dissolve, by heating, the above-described indium acetate and tin acetate, and by the dissolving, it is possible to easily obtain a precursor solution in which the carboxylic acid having 6 to 20 carbon atoms is respectively coordinated to indium and tin.

(Preparation of Precursor Solution)

In the step (I), the acetic acid concentration in the precursor solution is controlled in a range of 0.5% by mass to 6% by mass. The acetic acid concentration in the precursor solution can be adjusted by a known method. As an example, a method in which, in a case of removing acetic acid generated during the reaction from a reactor, not all acetic acid is not removed, and but a part thereof is removed and the remaining predetermined amount of acetic acid is returned to a reaction vessel is exemplified.

FIG. 1 is a schematic configuration diagram showing an example of a reactor which includes a Dean Stark trap and is used for preparing a precursor solution.

In the example of a reactor 10 shown in FIG. 1, the reactor 10 includes a reaction vessel 12 which stores the solvent including a carboxylic acid and having 6 to 20 carbon atoms, a cooling pipe 14 which cools acetic acid generated as a by-product during the reaction, and a Dean Stark trap 16 which retains cooled and liquefied acetic acid. In FIG. 1, glass beads 18 for adjusting the capacity of the Dean Stark trap 16 are placed in the Dean Stark trap 16.

In the reaction vessel 12 which stores the solvent including a carboxylic acid and having 6 to 20 carbon atoms, indium acetate and tin acetate are dissolved in the solvent to obtain a precursor solution.

Usually, by making the capacity of the Dean Stark trap 16 large enough, all acetic acid generated is retained in the Dean Stark trap 16 and is not returned to the precursor solution. However, in the producing method according to the embodiment of the present disclosure, by returning a certain amount of acetic acid to the reaction vessel 12, the amount of acetic acid included in the precursor solution of the reaction vessel is maintained in a range of 0.5% by mass to 6% by mass.

Examples of a method for adjusting the amount of acetic acid returned to the system include a method of controlling the amount of acetic acid returned by adjusting the capacity of the Dean Stark trap.

A method of adjusting the capacity of the Dean Stark trap is not particularly limited. For example, it is also possible to prepare a reactor including a Dean Stark trap having a predetermined capacity from the beginning. However, in a case where the amount of precursor solution in the reaction vessel fluctuates, the capacity of the Dean Stark trap in order to maintain the acetic acid concentration at a predetermined amount also fluctuates. Therefore, examples of a simpler method include a method of placing, in the Dean Stark trap, an amount of beads to be a predetermined capacity and adjusting the amount of acetic acid retained in the Dean Stark trap. The beads can be arbitrarily selected from, for example, ceramic beads, glass beads, metal beads, and the like which can be used as a dispersion medium. Among these, from the viewpoint that acid resistance is good and various particle sizes can be easily obtained, a method of adjusting the capacity using glass beads is preferable. The method of adjusting the capacity of the Dean Stark trap with glass beads is simple and the capacity can be adjusted accurately, which are preferable. The glass beads can be appropriately selected from glass beads having a size suitable for the purpose, and can be used by adjusting the placing amount.

The amount of acetic acid returned to the reaction solution is determined by a desired acetic acid concentration calculated from the amount of solvent included in the reaction vessel and the total amount of indium acetate and tin acetate as raw materials.

The preparation of the precursor solution in the step (I) is performed in a closed reactor, and by sufficiently cooling with a cooler, the generated acetic acid is not discharged to the outside of the system. Therefore, the total amount of acetic acid included in the reaction solution and acetic acid retained in the Dean Stark trap is constant. Accordingly, since the amount of acetic acid returned to the reaction solution is determined in a case where the amount of acetic acid retained in the Dean Stark trap is determined, the acetic acid concentration in the reaction solution can be easily controlled. Since the acetic acid concentration in the reaction solution and in the obtained precursor solution is kept constant, the acetic acid concentration in the reaction solution can be confirmed by measuring the acetic acid concentration in the precursor solution obtained after the reaction is completed.

By setting the acetic acid concentration in the precursor solution to be 0.5% by mass or more, it is possible to suppress a significant increase in the viscosity of the obtained precursor solution. In addition, by setting the acetic acid concentration to be 6% by mass or less, the undesired increase in the viscosity of the precursor solution, the generation of cloudiness due to the reprecipitation of indium dissolved in the carboxylic acid solution, and the like are suppressed, and the obtained precursor solution has good stability.

In a case where the acetic acid concentration in the precursor solution is in a range of 0.5% by mass to 6% by mass, the precursor solution is maintained at an appropriate viscosity for dropping, and the physical properties of ITO particles obtained from the precursor as a raw material are improved. The acetic acid concentration in the precursor solution is preferably in a range of 0.5% by mass to 5.5% by mass, and more preferably in a range of 1% by mass to 5% by mass.

From the viewpoint that the dropping property in the step (II) described later is easier, the viscosity of the precursor solution at 25° C. is preferably 0.14 Pa·s or less, more preferably 0.13 Pa·s or less, and still more preferably 0.12 Pa·s or less.

In the present disclosure, the viscosity of the precursor solution can be measured using a tuning fork vibro viscometer in accordance with "11. Viscosity measurement method using a vibration viscometer" described in JIS Z8803 (2011).

In the present disclosure, as the viscosity, a value obtained by dividing a result of measurement at 25° C. using, as a tuning fork vibro viscometer, a tuning fork vibro viscometer SV-10 manufactured by A&D Company, Limited by the density (g/cm$^3$) of the solution is adopted.

The precursor solution is prepared by mixing indium acetate, tin acetate, and the solvent including a carboxylic acid and having 6 to 20 carbon atoms, and heating the mixture.

Indium acetate and tin acetate are dissolved by heating, and a solution of a precursor in which the carboxylic acid having 6 to 20 carbon atoms is coordinated (for example, in a case of using oleic acid, indium oleate and tin oleate) can be obtained.

In the step (I), it is preferable that the amount of indium carboxylate and tin carboxylate is used such that the amount of tin with respect to the total amount of indium and tin ($[Sn/(In+Sn)]$) is 0.05 to 0.15 in a molar ratio.

That is, it is preferable that the amount of indium acetate and tin acetate is weighed and mixed such that the amount of tin with respect to the total amount of indium and tin ($[Sn/(In+Sn)]$) is 0.05 to 0.15 in a molar ratio.

By including indium and tin in the above-described molar ratio range, it is easy to obtain ITO particles which can be suitably used for use of optical material such as an optical filter and an optical lens and has a plasmon resonance peak of approximately 1900 nm or less.

The total molar concentration of metals included in the precursor solution is preferably 0.1 mmol (millimole)/mL or more and more preferably 0.3 mmol/mL or more.

Here, the total molar concentration of metals is a value based on the total amount of indium and tin included in the precursor solution.

By setting the molar concentration of metals in the precursor solution within the above-described range, the yield of ITO particles can be easily increased.

The upper limit of the total molar concentration of metals included in the precursor solution is not particularly limited, but from the viewpoint of better solubility, the total molar concentration of metals included in the precursor solution can be set to 5 mmol/mL or less.

The heating temperature and heating time in a case of preparing the precursor solution are appropriately selected depending on the kinds and content of indium acetate, tin acetate, and solvent including a carboxylic acid and having 6 to 20 carbon atoms to be used.

For example, in a case where indium acetate and tin (IV) acetate are used as the raw materials, and oleic acid is used as the solvent, it is preferable to heat at a temperature having an upper limit of 140° C. to 160° C. for approximately 1 hour. Under the above-described conditions, a yellow transparent precursor solution can be obtained.

In a case of preparing the precursor solution, in order to prevent a reaction system from being mixed with impurities such as oxygen and water, the mixing of the raw materials is preferably performed in a glove box or the like in which the oxygen concentration and the moisture concentration are controlled. In addition, in a case of preparing the precursor solution by heating the raw materials and the solvent, it is preferable to flow an inert gas such as nitrogen into, for example, the reactor 10 as shown in FIG. 1.

Since the acetic acid concentration in the obtained precursor solution is maintained in an appropriate range, the viscosity and physical properties suitable for dropping in the next step are maintained for a long period of time. Furthermore, even in a case where the temperature of the precursor solution decreases to around room temperature (25° C.) over time, a large increase in viscosity and generation of precipitates are suppressed, resulting in a stable precursor solution.

For example, the obtained precursor solution can be applied to the next step (step (II) by being filled into a syringe. In a case of filling the precursor solution into the syringe for dropping so as to apply to the step (II), in order to avoid mixing of oxygen and water, the filling operation is preferably performed in a glove box or the like in which the oxygen concentration and the moisture concentration are controlled.

Examples of the controlled conditions of oxygen concentration and moisture concentration include conditions in which the oxygen concentration is 5 ppm or less and the moisture concentration is 1 ppm or less, but the controlled conditions are not limited thereto. Here, ppm is based on volume.

[Step (II)]

The step (II) is a step of obtaining a reaction solution including indium tin oxide particles by dropwise adding the precursor solution obtained in the step (I) to a solvent having a hydroxy group and having 14 to 22 carbon atoms, which has a temperature of 230° C. to 320° C.

Since the increase in viscosity of the precursor solution obtained in the step (I) is suppressed, and the precursor solution obtained in the step (I) has a viscosity suitable for dropping, for example, the viscosity at 25° C. is maintained at 0.14 Pa·s or less, even in a case where a syringe is used for dropping, the dropping can be easily performed at an arbitrary rate without applying excessive pressure. Therefore, the precursor solution obtained in the step (I) in the producing method according to the embodiment of the present disclosure has an advantage in which the dropping rate in the step (II) can be easily adjusted. The advantage in which the dropping rate can be easily adjusted can be said to be advantageous in increasing the dropping rate of the precursor solution in the step (II).

(Solvent for Synthesizing ITO Particles)

In the preparation of the reaction solution, a solvent having a hydroxy group and having 14 to 22 carbon atoms is used. The solvent is selected from the viewpoint of stability at the reaction temperature. Hereinafter, a solvent having a hydroxy group and having 14 to 22 carbon atoms may be referred to as a solvent for synthesis.

The solvent for synthesis used in the step (II) is a compound which has a hydrocarbon group having 14 to 22 carbon atoms and has a hydroxy group.

The number of carbon atoms in the solvent for synthesis, that is, the number of carbon atoms in the hydrocarbon group included in the solvent for synthesis is 14 to 22, preferably 16 to 20.

In the above-described range of carbon atoms, the hydrocarbon group in the solvent for synthesis may be linear, may have a branch, or may have a ring structure. Among these, the hydrocarbon group in the solvent for synthesis is preferably a linear hydrocarbon group. The hydrocarbon group may be a saturated hydrocarbon group or an unsaturated hydrocarbon group.

Among these, examples of a preferred solvent for synthesis include the following solvent for synthesis, which has a linear hydrocarbon group having 14 to 22 carbon atoms and has a hydroxy group.

Specific examples of the solvent which has a linear hydrocarbon group having 14 to 22 carbon atoms and has a hydroxy group include myristyl alcohol, stearyl alcohol, palmityl alcohol, behenyl alcohol, arachidyl alcohol, palmitoleyl alcohol, oleyl alcohol, linoleyl alcohol, and docosenol.

The solvent for synthesis preferably includes one or two or more solvents selected from the group consisting of the above-exemplified solvents.

As the solvent for synthesis, from the viewpoint that the boiling point is sufficiently lower than the reaction temperature, the melting point is a temperature at which the solution is not solid in a case of being cooled to room temperature after the reaction, and workability is good, one or two or more solvents selected from the group consisting of palmitoleyl alcohol, oleyl alcohol, and linoleyl alcohol is more preferable, and it is still more preferable to include oleyl alcohol.

ITO particles are formed in the reaction solution by heating the above-described solvent for synthesis having a hydroxy group to a temperature condition of 230° C. to 320° C. and dropwise adding the precursor solution obtained in the step (I), in which the carboxylic acid is coordinated to indium and tin, to the solvent for synthesis. As a mechanism of the reaction, it is assumed that Metal-OH is formed according to an esterification reaction with a hydroxy group and a carboxylic acid, and a Metal-O-Metal bond is formed by further dehydration.

In a case of the reaction, the above-described solvent for synthesis having a hydroxy group is charged into a reaction vessel such as a three-neck flask and heated. In a case of charging the solvent for synthesis into the reaction vessel, in order to avoid mixing of oxygen and water into the reaction system, the charging is preferably performed in a glove box or the like in which the oxygen concentration and the moisture concentration are controlled.

The heating temperature of the solvent for synthesis is not particularly limited as long as the heating temperature is a temperature at which the ITO particles are easily formed. The heating temperature of the solvent for synthesis can be 230° C. to 320° C., which is a temperature at which the ITO particles are easily formed. For example, in a case where oleyl alcohol is used as the solvent for synthesis, the heating temperature is preferably 230° C. to 320° C., more preferably 250° C. to 300° C., and still more preferably 280° C. to 300° C.

(Synthesis)

ITO particles are obtained by the reaction in the solvent for synthesis, in which the precursor solution obtained in the step (I) is added dropwise to the preheated solvent having a hydroxy group and having 14 to 22 carbon atoms.

The dropping rate can be appropriately adjusted depending on the types of the indium raw material and tin raw material included in the precursor solution to be used, the concentration of the precursor solution, and the like. Among these, from the viewpoint that the ITO particles can be formed more efficiently, the precursor solution is preferably added dropwise at a dropping rate of 1.0 mL/min or more, and more preferably added dropwise at a dropping rate of 1.5 mL/min or more.

In addition, the dropping rate has no particular upper limit, but from the viewpoint of facility cost, can be set to 100 mL/min or less.

By setting the dropping rate to 1.0 mL/min or more, for example, the total amount of the precursor solution added dropwise to the reaction system can be set to 50 mL or more, and the ITO particles can be efficiently formed.

The amount of the precursor solution added dropwise can be appropriately adjusted depending on composition of the precursor solution, the amount of the solvent for synthesis to be used, such as alcohol, and the like. The amount added dropwise is preferably 50 mL or more and more preferably 100 mL or more. In addition, from the viewpoint of facility cost, the amount added dropwise is preferably set to 5 L or less.

In this case, since water, free acetic acid, and the like are generated with the esterification reaction, it is preferable to flow an inert gas such as nitrogen into the reaction system so as to discharge the generated water, acetic acid, and the like to the outside of the system, from the viewpoint that the esterification reaction is more likely to proceed and the yield of ITO particles is further improved.

The flow rate of the inert gas such as nitrogen is appropriately adjusted depending on the reaction scale, the dropping rate, and the like. In a case where the flow rate of the inert gas is too low, the water, acetic acid, and the like cannot be sufficiently discharged to the outside of the system and bumping may occur in the reaction solution. Therefore, in the flow rate of the inert gas such as nitrogen, it is preferable to set a flow rate capable of sufficiently removing the water, acetic acid, and the like from the system.

It is preferable that the generated water, acetic acid, and the like are discharged to the outside of the system. On the other hand, it is preferable that the solvent in the reaction solution, which has a hydroxy group and has 14 to 22 carbon atoms, is not discharged to the outside of the system and is retained in the reaction solution.

From this viewpoint, it is preferable that a reactor used for the synthesis of ITO particles in the step (II) is the reactor used in the production of the precursor solution in the step (I), as shown in FIG. 1, with an appropriate capacity of Dean Stark trap placed between the reaction vessel and the cooling pipe.

By using the reactor with an appropriate capacity of Dean Stark trap, acetic acid and water, which have higher specific gravity than the solvent for synthesis, are stored in the Dean Stark trap, and only the solvent having a hydroxy group and having 14 to 22 carbon atoms, and has lighter specific gravity, can be returned to the system. Therefore, even in a case where the reaction is performed continuously for a certain period of time, the solvent for synthesis, which has a lower boiling point than water and the like and is more volatile, returns to the reaction vessel by cooling, and the reaction described above is continued in a sufficient amount of the solvent for synthesis.

In the reaction solution, in a case where the content of the hydroxy group included in the solvent having a hydroxy group and having 14 to 22 carbon atoms is denoted by A mol, and the content of the carboxylic acid included in the precursor solution and having 6 to 20 carbon atoms is denoted by B mol, A and B preferably satisfy a condition of Expression (I), and more preferably satisfy a condition of Expression (II).

$$B/(A+B)<0.5 \qquad \text{Expression (I)}$$

$$B/(A+B)<0.46 \qquad \text{Expression (II)}$$

By satisfying the condition of Expression (I), the esterification reaction is likely to proceed and the yield of ITO particles is improved.

In a case of the reaction, from the viewpoint that the yield of ITO particles is further improved, it is preferable to satisfy Expression (III).

$$0.1<B/(A+B)<0.5 \qquad \text{Expression (III)}$$

The value of $B/(A+B)$ can be obtained by calculating the number of moles from the amounts of the carboxylic acid and alcohol solvent used in the preparation of the precursor solution in the step (I) and the respective molecular weights.

In the step (II), by reacting a stable precursor solution with the solvent for synthesis to sufficiently proceed the esterification reaction, ITO particles with nano-order size are produced.

In the producing method according to the embodiment of the present disclosure, since the precursor solution obtained in the step (I) has good stability and maintains excellent dropping property after a lapse of time, it is possible to efficiently synthesize ITO particles. It can be said that, since the dropping property is good, the effects of the present disclosure are remarkable particularly in a case where the dropping rate is high in the step (II).

The producing method according to the embodiment of the present disclosure may further include optional steps in addition to the step (I) and step (II) described above.

Examples of the optional step include a step (step (III)) of retaining the formed ITO particles at a predetermined temperature, and a step (step (IV)) of purifying the ITO particles dispersed in the reaction solution.

[Step (III)]

In the method for producing ITO particles according to the embodiment of the present disclosure, a step (step (III)) of, after the completion of the dropwise addition of the precursor solution in the step (II), retaining the obtained reaction solution, for example, under a temperature condition of 230° C. to 320° C. for 60 minutes to 180 minutes can be performed optionally.

After the completion of the dropwise addition of the precursor solution in the step (II), the obtained reaction solution is not immediately cooled, but retained, for example, under a temperature condition of 230° C. to 320° C. for 60 minutes to 180 minutes. As a result, the physical properties of the obtained ITO particles are further improved.

The temperature of the reaction solution is not necessarily retained at a constant temperature in the range of retention time exemplified above, as long as the temperature is retained in a range of 230° C. to 320° as exemplified above. In the retention of the temperature of the reaction solution in the above-exemplified range, for example, the temperature condition may be set to 230° C. at an initial retention time and the temperature may be gradually raised to a predetermined temperature of 320° C. or lower, which is a preferred upper limit value, or the initial temperature may be set to 320° C., which is a preferred upper limit value, and the temperature may be gradually lowered to a predetermined temperature of 230° C. or higher, which is a preferred lower limit value. In addition, in a case of using a reaction vessel equipped with a temperature adjusting mechanism, it is sufficient that the temperature of the reaction solution is retained in a range of 230° C. to 320° C., which is a preferred temperature range, even in a case of some temperature fluctuation.

The reaction temperature (temperature of the reaction solution) in the step (II) and the retention temperature in the step (III) may be the same as or different from each other as long as the temperatures are within the respectively defined temperature ranges.

The retention temperature of the reaction solution is preferably in a range of 230° C. to 320° C., more preferably 250° C. to 310° C., and still more preferably 280° C. to 300° C.

The time for retaining the reaction solution at the above-described temperature is preferably 60 minutes to 180 minutes and more preferably 75 minutes to 150 minutes.

By retaining the reaction solution in the above-described temperature range for the above-described time, it can be expected that the defects of the ITO particles, which are a concern in a case of increasing the dropping rate during the reaction, are compensated.

That is, by providing the step (III) optionally, it can be expected that it is easy to set the plasmon resonance peak of the ITO particles to be lower, specifically, for example, to approximately 1800 nm or less, and absorbing particles of the obtained ITO particles have better absorption in the near infrared region.

[Step (IV)]

After the step (II) described above or the step (III) optionally performed, a step [Step (IV)] of purifying the ITO particles dispersed in the reaction solution can be performed.

The step (IV) includes a step in which, after the step (II) or the step (III), the reaction solution is cooled, only ITO particles are extracted by centrifugation or filtration, and the extracted ITO particles are redispersed in a non-polar solvent such as toluene, hexane, octane, benzene, and chloroform.

For the purpose of more efficiently separating and extracting the ITO particles, prior to cooling the reaction solution and performing centrifugation or filtration to extract ITO particles, one or two or more solvents which function as a poor solvent for the synthesized ITO particles may be added to the reaction solution.

By adding a solvent which functions as a poor solvent for the synthesized ITO particles, dispersibility of the synthesized ITO particles is reduced to facilitate aggregation, and the ITO particles can be collected more efficiently in the subsequent centrifugation or filtration.

As the solvent which functions as a poor solvent for the synthesized ITO particles, from the viewpoint that an appropriate aggregation promoting effect can be achieved on the above-described ITO particles, ethanol or acetone is preferable and ethanol is more preferable.

The addition amount of the solvent which functions as a poor solvent for the synthesized ITO particles is not particularly limited, and for example, by adding an amount of a poor solvent such that cloudiness due to aggregation of ITO particles in the reaction solution is visually observed, the desired appropriate aggregation promoting effect can be obtained.

By redispersing the extracted ITO particles in a non-polar solvent, an ITO particle dispersion from which impurities in the reaction solution have been removed can be obtained. With the step (IV), by removing impurities and dispersing ITO particles from which impurities have been removed in a non-polar solvent, an ITO particle dispersion having better dispersibility can be obtained.

The step (IV), that is, extraction of ITO particles by centrifugation or filtration and redispersion in a non-polar solvent may be performed once or a plurality of times.

(Method of Confirming Composition of ITO Particles)

The content of indium and content of tin in the ITO particles obtained by the producing method according to the embodiment of the present disclosure are measured by inductively coupled plasma (ICP) mass spectrometry.

(Particle Size of ITO Particles)

The number-average particle size of the ITO particles obtained by the producing method according to the embodiment of the present disclosure is preferably 10 nm to 30 nm, more preferably 15 nm to 25 nm, and still more preferably 20 nm to 25 nm.

By setting the number-average particle size within the above-described range, in a case where the ITO particles are blended into a curable composition and the like, scattering in a visible light region is suppressed and an increase in viscosity of the composition is easily suppressed. By suppressing the increase in viscosity of the composition, the particles can be dispersed in a higher concentration, and as a result, a curable composition having a lower Abbe number can be obtained.

The number-average particle size can be obtained by observing the particles with a transmission electron microscope (TEM), calculating an equivalent circular size of at least 100 particles, and calculating an arithmetic average value thereof.

In addition, from the viewpoint of controlling the resonance peak sharply, it is desirable that the standard deviation of the number-average particle size is 5 nm or less, and it is more desirable that standard deviation of the number-average particle size is 3 nm or less.

The standard deviation can be obtained by observing the particles with a transmission electron microscope (TEM), calculating an equivalent circular size of at least 100 particles, and calculating a standard deviation thereof.

(Use Aspect of ITO Particles)

The ITO particles obtained by the producing method according to the embodiment of the present disclosure can be used as optical material by being contained in a curable composition.

Examples of the curable composition (hereinafter, sometimes simply referred to as a "composition") include a composition including the above-described ITO particles obtained by the producing method according to the embodiment of the present disclosure, and a polymerizable compound.

The curable composition is a composition cured by applying energy from the outside, preferably a composition cured by heat or light, and more preferably a composition cured by light.

Hereinafter, a preferred aspect of the curable composition including the ITO particles obtained by the producing method according to the embodiment of the present disclosure will be described together with a method for producing a curable composition.

<Method for Producing Curable Composition>

The method for producing the curable composition including the indium tin oxide particles obtained by the producing method according to the embodiment of the present disclosure is not particularly limited, and a known method for producing a curable composition can be appropriately applied. Among these, it is preferable to produce the curable composition by the method for producing a curable composition according to the embodiment of the present disclosure described below.

The method for producing a curable composition according to the embodiment of the present disclosure includes a step (step (I)+step (II): first step) of obtaining indium tin oxide particles by the above-described producing method according to the embodiment of the present disclosure, and a step (step (V): second step) of obtaining a curable composition having absorption in a near infrared region by mixing the obtained indium tin oxide particles and a polymerizable compound.

In addition to the step (I) and the step (II), the step of obtaining indium tin oxide particles may further include the step (III), step (IV), and the like, which are optional steps.

In a case of using a curable composition as an optical material, it is preferable that the curable composition is a composition having a low refractive index and a low Abbe number. Each characteristic will be described later.

The Abbe number is a value calculated by Equation 1.

$$\text{Abbe number } v_d = (n_d - 1)/(n_f - n_c) \qquad \text{Equation 1}$$

In Equation 1, $n_d$ represents a refractive index for the D line (wavelength of 587.56 nm), $n_f$ represents a refractive index for the F line (wavelength of 486.1 nm), and $n_c$ represents a refractive index for the C line (wavelength of 656.3 nm), respectively. A method of measuring the refractive index will be described later.

The C line, D line, and F line are the C line, D line, and F line in the Fraunhofer line.

As described above, since the ITO particles obtained by the producing method according to the embodiment of the present disclosure has a peak wavelength of a plasmon resonance absorption in the near infrared region (for example, preferably a wavelength of 1800 nm or less), a curable composition having a low Abbe number can be realized. The curable composition having a low Abbe number can be expected to improve performance in a case of being used as a diffraction grating lens. In addition, the use of the curable composition having a low Abbe number leads to an improvement in degree of freedom in a case of designing an optical element.

[First Step in Method for Producing Curable Composition]

The first step in the method for producing a curable composition according to the embodiment of the present disclosure is a step of producing ITO particles, and is the same as the step of producing ITO particles according to the step (I) and step (II) of the above-described producing method according to the embodiment of the present disclosure, and the preferred aspects are also the same.

In the first step, since the ITO particles obtained in a state of being dispersed in the solvent are in a state of being dispersed in the reaction solution, the above-described step (step (IV)) of purifying the ITO particles may be performed by, for example, adding a poor solvent such as ethanol to the reaction solution to reduce dispersibility of ITO particles to some extent, performing centrifugation to settle the particles, removing the supernatant, and redispersing the ITO particles in toluene. The step of purifying the ITO particles may be repeated a plurality of times as necessary.

[Second Step in Method for Producing Curable Composition: Step (V)]

The method for producing a curable composition according to the embodiment of the present disclosure has, as a second step, a step of mixing the obtained indium tin oxide particles and a polymerizable compound.

The method of mixing the indium tin oxide particles and the polymerizable compound is not particularly limited.

It is preferable that the indium tin oxide particles and the polymerizable compound are stirred and mixed until no separation is visually observed and a uniform mixture is obtained.

(Content of ITO Particles)

In the second step, the amount of the ITO particles to be used in a case of mixing the ITO particles and the polymerizable compound is preferably an amount such that the amount of ITO particles in the obtained curable composition with respect to the total solid content of the composition is 18% by mass or more, more preferably an amount such that the amount of ITO particles in the obtained curable composition with respect to the total solid content of the composition is 38% by mass or more, and still more preferably an amount such that the amount of ITO particles in the obtained curable composition with respect to the total solid content of the composition is 43% by mass or more.

In addition, the content with respect to the total solid content of the composition is preferably 80% by mass or less, more preferably 75% by mass or less, and still more preferably 70% by mass or less.

In the present disclosure, the "total solid content" refers to the total amount of components in the composition, excluding volatile components such as a solvent.

The content of the ITO particles in the curable composition can be calculated, in a case where the composition is subjected to a thermal mass spectrometry and remaining solid components after heating to a temperature (for example, 500° C.) at which liquid components can be completely removed are regarded as ITO particles, as a mass content of the ITO particles with respect to the total solid content of the curable composition to be measured.

(Polymerizable Compound)

A polymerizable compound which can be used in the method for producing a curable composition according to the embodiment of the present disclosure will be described.

By mixing the above-described ITO particles obtained by the producing method according to the embodiment of the present disclosure and the polymerizable compound, a curable composition containing the ITO particles and the polymerizable compound can be obtained.

The polymerizable compound is not particularly limited as long as the polymerizable compound is a compound which can be polymerized and cured. As the polymerizable compound, a radically polymerizable compound is preferable, and an ethylenically unsaturated compound having at least one ethylenically unsaturated group in the molecule is more preferable.

As the ethylenically unsaturated compound, from the viewpoint of easily setting the refractive index of the curable composition after curing to approximately 1.5 to 1.55, which is a suitable value for use, for example, in a diffraction grating lens, a polyfunctional ethylenically unsaturated compound having two or more ethylenically unsaturated groups is preferable, and a polyfunctional (meth)acrylate compound having two or more (meth)acryloxy groups is more preferable.

Examples of the polyfunctional ethylenically unsaturated compound include 1,4-divinylcyclohexane, 1,4-cyclohexanedimethanol divinyl ether, divinylbenzene, 1,6-divinylnaphthalene, ethoxylated bisphenol A divinyl ether, propoxylated bisphenol A di(meth)acrylate; polyethylene glycol di(meth)acrylate, polypropylene glycol di(meth)acrylate, trimethylolethane tri(meth)acrylate, neopentyl glycol di(meth)acrylate, pentaerythritol tri(meth)acrylate, pentaerythritol tetra(meth)acrylate, dipentaerythritol hexa(meth)acrylate, hexanediol di(meth)acrylate, tricyclodecane dimethanol diacrylate, tri(acryloyloxyethyl) isocyanurate, tris(2-acryloxyethyl) isocyanurate, and compounds similar to these compounds.

The curable composition may contain one kind of polymerizable compound or may contain two or more kinds thereof.

The content of the polymerizable compound in the curable composition is preferably 15% by mass to 85% by mass, more preferably 20% by mass to 70% by mass, and still more preferably 30% by mass to 60% by mass with respect to the total solid content of the curable composition.

(Polymerization Initiator)

The curable composition preferably contains a polymerization initiator.

From the viewpoint that the curable composition is an ultraviolet curing-type curable composition, it is preferable to contain a photopolymerization initiator as the polymerization initiator.

The polymerization initiator can be appropriately selected depending on the polymerizable compound contained in the curable composition. For example, in a case where the curable composition includes a radically polymerizable compound as the polymerizable compound, it is preferable that a polymerization initiator which can be included as desired is a radical polymerization initiator.

Hereinafter, a photoradical polymerization initiator which is a preferred aspect as the polymerization initiator will be described.

As the photoradical polymerization initiator, a photoradical polymerization initiator including an acylphosphine oxide structure, an α-hydroxyalkylphenone structure, or an α-aminoalkylphenone structure is preferable.

The photoradical polymerization initiator is not particularly limited in structure, and examples thereof include 2,4,6-trimethylbenzoyldiphenylphosphine oxide, bis(2,4,6-trimethylbenzoyl)phenylphosphine oxide, 2,2-dimethoxy-1,2-diphenylethan-1-one, 1-hydroxycyclohexyl phenylketone, 1-hydroxycyclohexyl phenylketone, 1-[4-(2-hydroxyethoxy)phenyl]-2-hydroxy-2-methyl-1-propan-1-one, 2-hydroxy-1-{4-[4-(2-hydroxy-2-methyl-propionyl)benzyl]phenyl}-2-methyl-propan-1-one, and 2-methyl-1-(4-methylthiophenyl)-2-morpholinopropan-1-one.

A commercially available product may be used as the photoradical polymerization initiator, and specific examples of the commercially available product include IRGACURE (trademark) series manufactured by BASF (for examples, IRGACURE TPO, IRGACURE 819, IRGACURE 651, IRGACURE 184, IRGACURE 1173, IRGACURE 2959, IRGACURE 127, and IRGACURE 907).

In a case where the curable composition includes a polymerization initiator, the polymerization initiator may be included singly or in combination of two or more thereof.

From the viewpoint of wear resistance and high-temperature stretchability of a cured product obtained by using the curable composition, the content of the polymerization initiator in a case where the curable composition includes the polymerization initiator is preferably 0.05% by mass to 10% by mass, more preferably 0.1% by mass to 10% by mass, still more preferably 0.1% by mass to 5% by mass, and particularly preferably 0.5% by mass to 3% by mass with respect to the total mass of the polymerizable compound.

(Dispersant)

The curable composition may contain a dispersant.

By including the dispersant, dispersibility of the ITO particles in the curable composition can be further increased, and as a result, the obtained curable composition easily achieves high visible light transmission characteristics, low Abbe number, and the like.

As the dispersant which can be included in the curable composition, a cationic surfactant, a nonionic surfactant, and an amphoteric surfactant are effective. In addition, a basic compound such as ammonia can also be used.

In particular, as a dispersant and a surfactant which functions as the dispersant, polyester-based compounds, ε-caprolactone-based compounds, polycarboxylic acid salts, polyphosphoric acid salts, hydrostearic acid salts, amidosulfonic acid salts, polyacrylic acid salts, olefin-maleic acid salt copolymers, acryl-maleic acid salt copolymers, organic amine-based compounds such as alkylamine acetate salt, organic phosphoric acid-based compounds, alkyl fatty acid salts, fatty acid polyethylene glycol ester-based compounds, silicon-based compounds, or fluorine-based compounds can be used.

Among these, it is suitable to use at least one basic dispersant selected from the group consisting of ammonia and organic amine-based compounds.

A commercially available product may be used as the dispersant. Specific examples of basic dispersants as a commercially available product include DISPERBYK series (manufactured by BYK Japan KK), Solsperse series (manufactured by Zeneca), and TAMN series (manufactured by Nikko Chemicals Co., Ltd.). From the viewpoint that dispersibility is easily increased because of adsorbability to the ITO particles and steric hindrance, DISPERBYK-161 (amine-based) or DISPERBYK-111 (phosphoric acid-based) is preferable.

In a case where the curable composition includes a dispersant, the dispersant may be included singly or in combination of two or more thereof.

The content of the dispersant in a case where the curable composition includes the dispersant is preferably 1% by mass to 30% by mass, more preferably 3% by mass to 20% by mass, and still more preferably 5% by mass to 15% by mass with respect to the total mass of ITO particles in the curable composition.

(Other Components)

The curable composition may contain other components other than the above-described compounds, in addition to the ITO particles, the polymerizable compound, and the polymerization initiator and the dispersant which are preferred optional components described above.

Examples of the other components include a solvent, a polymerization inhibitor, a surfactant other than the above-described dispersant, a plasticizer, and a sensitizer. In the method for producing a curable composition according to the embodiment of the present disclosure, in order to further improve curability of the obtained curable composition and suppress the occurrence of non-uniformity inside the film during curing, it is preferable that the curable composition does not contain a solvent.

The curable composition can be produced by stirring and mixing each of these components. The timing of mixing each component is arbitrary, and it is sufficient that each component is appropriately added depending on the physical properties of each component.

(Characteristics of Curable Composition)

Preferred characteristics of the curable composition obtained by the method for producing a curable composition according to the embodiment of the present disclosure will be shown below.

—Abbe Number—

The curable composition including the ITO particles obtained by the producing method according to the embodiment of the present disclosure can achieve a low Abbe number. From such a viewpoint, the Abbe number of the obtained curable composition is preferably 8 to 30, more preferably 10 to 25, and still more preferably 10 to 20.

The Abbe number of the curable composition can be measured using a refractometer.

In the present disclosure, the curable composition uses a value measured using a refractometer DR-M2 manufactured by ATAGO CO., LTD.

—Refractive Index—

In the curable composition, the refractive index nD for light having a wavelength of 589 nm is preferably 1.40 to 1.60 and more preferably 1.40 to 1.55.

As described above, the refractive index in the present disclosure is measured using a refractometer DR-M2 manufactured by ATAGO CO., LTD.

—Visible Light Transmittance—

In the curable composition according to the present disclosure, the visible light transmittance (hereinafter, sometimes simply referred to as "transmittance") at a wavelength of 405 nm is preferably 85% to 100% and more preferably 90% to 100%.

The visible light transmittance can be measured using a spectrophotometer.

As the visible light transmittance in the present disclosure, a value measured using a spectrophotometer V-670 manufactured by JASCO Corporation, and in a case of being converted into an optical path length of 10 μm is adopted.

(Use of Curable Composition)

The curable composition obtained by the method for producing a curable composition according to the embodiment of the present disclosure can be preferably used for producing an optical material having a low Abbe number and low refractive index, and is particularly preferably used for producing a diffraction grating lens. The use of the curable composition obtained by the producing method according to the embodiment of the present disclosure is not limited thereto.

EXAMPLES

Hereinafter, the embodiments of the present invention will be more specifically described with reference to Examples. The materials, amounts to be used, proportions, treatment contents, treatment procedures, and the like shown in Examples can be appropriately modified as long as the modifications do not depart from the spirit of the embodiments of the present invention. Therefore, the scope of the embodiments of the present invention is not limited to the following specific examples.

In the following examples, "parts" and "%" are based on mass unless otherwise specified.

Example 1

First, 187.5 mL (milliliter) of oleic acid (manufactured by Sigma-Aldrich, Inc., technical grade, 90%), 25.151 g (87 mmol (millimole)) of indium acetate (manufactured by Alfa Aesar, 99.99%), and 2.697 g (8.5 mmol) of tin (IV) acetate (manufactured by Alfa Aesar) were added in a flask, and the mixture was heated at 160° C. for 2 hours under an environment of nitrogen flow to obtain a yellow transparent precursor solution (step (I)).

As shown in FIG. 1, the preparation of the precursor solution in the step (I) was performed using a reactor in which a Dean Stark trap and a cooling pipe were placed on the upper part of the flask. By putting glass beads into the Dean Stark trap to adjust the capacity of the Dean Stark trap to 13 mL, 13 mL of the generated acetic acid was stored in the Dean Stark trap to remove the generated acetic acid from the system.

In a case where the acetic acid concentration of the obtained precursor solution was evaluated by a nuclear magnetic resonance (NMR) spectrometer, the acetic acid concentration was 0.5%.

AVANCE III HD (600 MHz) manufactured by Bruker was used for NMR, and the measurement was performed under the following conditions.

<Conditions>

Nuclear species: 1H

Lock solvent: deuterated chloroform

Relaxation delay time: 2s

Integration times: 16 times

Internal standard: benzene

In a case where the viscosity of the obtained precursor solution at 25° C. was evaluated by a tuning fork vibro viscometer SV-10 manufactured by A&D Company, Limited, and calculated, the viscosity was 0.115 Pa·s.

225 mL of oleyl alcohol (manufactured by FUJIFILM Wako Pure Chemical Corporation, purity: 80% to 85%) was added in another flask, and heated at 285° in a nitrogen flow.

Using a syringe pump, the precursor solution obtained in the step (I) was added dropwise to the oleyl alcohol heated to 285° C. at a rate of 1.75 mL/min (step (II)).

The precursor solution had been injected into a syringe under an environment of oxygen concentration of 1 ppm.

After the completion of the dropwise addition of the precursor solution, the temperature of the obtained reaction solution was maintained at 285° C. and retained for 60 minutes, and thereafter, the heating was stopped and the reaction solution was cooled to room temperature (25° C.).

Here, in a case where the content of hydroxy group included in the oleyl alcohol of the reaction solution was denoted by A mol, and the content of oleic acid included in the precursor solution was denoted by B mol, it was confirmed that A and B satisfied the following relation. The following value was obtained by calculating the number of moles from the amounts of the oleic acid and oleyl alcohol used in the preparation of the precursor solution in the step (I) and the respective molecular weights.

$$B/(A+B)=0.455$$

In addition, the total molar concentration of metals included in the precursor solution, which was calculated from the amounts of indium acetate and tin acetate added, was 0.5 mmol/mL.

The obtained reaction solution was centrifuged to precipitate the formed ITO particles, and then the supernatant was removed to obtain a precipitate of ITO particles.

The obtained precipitate of ITO particles was subjected to the following treatments a) and b) twice to purify the ITO particles (Step (IV)).

a) 300 mL of toluene was added to the precipitate of ITO particles to redisperse the ITO particles, and 300 mL of ethanol was added thereto so as to be cloudy.

b) the clouded solution was centrifuged to precipitate the ITO particles, and then the supernatant was removed to obtain a precipitate of ITO particles.

300 ml of toluene was added to the precipitate of purified ITO particles to redisperse the purified ITO particles, thereby obtaining a toluene dispersion liquid of ITO particles coordinated with oleic acid.

In a case where the obtained ITO particles were observed with TEM according to the above-described method to measure particle size, the number-average particle size was 21 nm.

Example 2

A toluene dispersion liquid of ITO particles was obtained in the same manner as in Example 1, except that, in the step (I) of Example 1, by adjusting the amount of glass beads put into the Dean Stark trap, 8.9 mL of the generated acetic acid was stored in the Dean Stark trap to remove the generated acetic acid from the system.

The acetic acid concentration and viscosity of the precursor solution obtained in the step (I) were measured in the same manner as in Example 1.

As a result, the acetic acid concentration of the precursor solution was 3%, and the viscosity was 0.125 Pa·s.

Example 3

A toluene dispersion liquid of ITO particles was obtained in the same manner as in Example 1, except that, in the step (I) of Example 1, by adjusting the amount of glass beads put into the Dean Stark trap, 6.3 mL of the generated acetic acid was stored in the Dean Stark trap to remove the generated acetic acid from the system.

The acetic acid concentration and viscosity of the precursor solution obtained in the step (I) were measured in the same manner as in Example 1.

As a result, the acetic acid concentration of the precursor solution was 4.5%, and the viscosity was 0.11 Pa·s.

Example 4

A toluene dispersion liquid of ITO particles was obtained in the same manner as in Example 1, except that, in the step (I) of Example 1, by adjusting the amount of glass beads put into the Dean Stark trap, 3.8 mL of the generated acetic acid was stored in the Dean Stark trap to remove the generated acetic acid from the system.

The acetic acid concentration and viscosity of the precursor solution obtained in the step (I) were measured in the same manner as in Example 1.

As a result, the acetic acid concentration of the precursor solution was 6%, and the viscosity was 0.14 Pa·s.

Comparative Example 1

A toluene dispersion liquid of ITO particles was attempted to be obtained in the same manner as in Example 1, except that, in the step (I) of Example 1, a Dean Stark trap with a capacity of 15 mL was placed, and all acetic acid generated was removed from the system.

The acetic acid concentration and viscosity of the precursor solution obtained in the step (I) were measured in the same manner as in Example 1.

As a result, the acetic acid concentration of the precursor solution was below the detection limit (0.1% or less). Therefore, the acetic acid concentration of the precursor solution is described as 0% in Table 1. The viscosity of the precursor solution was as high as 4.00 Pa·s. An attempt was made to add dropwise the obtained high-viscosity precursor solution to oleyl alcohol heated in the same manner as in Example 1, but since the viscosity of the precursor solution was high, it was not possible to add dropwise the precursor solution at a dropping rate of 1.75 ml/min using a syringe. Therefore, no further evaluation was performed.

Comparative Example 2

A precursor solution was obtained in the same manner as in Example 1, except that, in the step (I) of Example 1, by adjusting the amount of glass beads put into the Dean Stark trap, 2.9 mL of the generated acetic acid was stored in the Dean Stark trap to remove the generated acetic acid from the system.

The acetic acid concentration and viscosity of the precursor solution obtained in the step (I) were measured in the same manner as in Example 1.

As a result, the acetic acid concentration of the precursor solution was 6.5%, and the viscosity was 0.22 Pa·s. In a case where the precursor solution was visually observed, the precursor solution was cloudy and a precipitate was formed, and a uniform precursor solution could not be obtained.

Using a syringe pump, the obtained cloudy precursor solution was added dropwise to the heated oleyl alcohol at a rate of 1.75 mL/min in the same manner as in Example 1, thereby obtaining a toluene dispersion liquid of ITO particles in the same manner as in Example 1.

Regarding the precursor solutions prepared by the producing methods of Examples 1 to 4 and Comparative Examples 1 and 2, the acetic acid concentration included in the precursor solution and the viscosity of the precursor solution were shown in Table 1.

Figure 2:
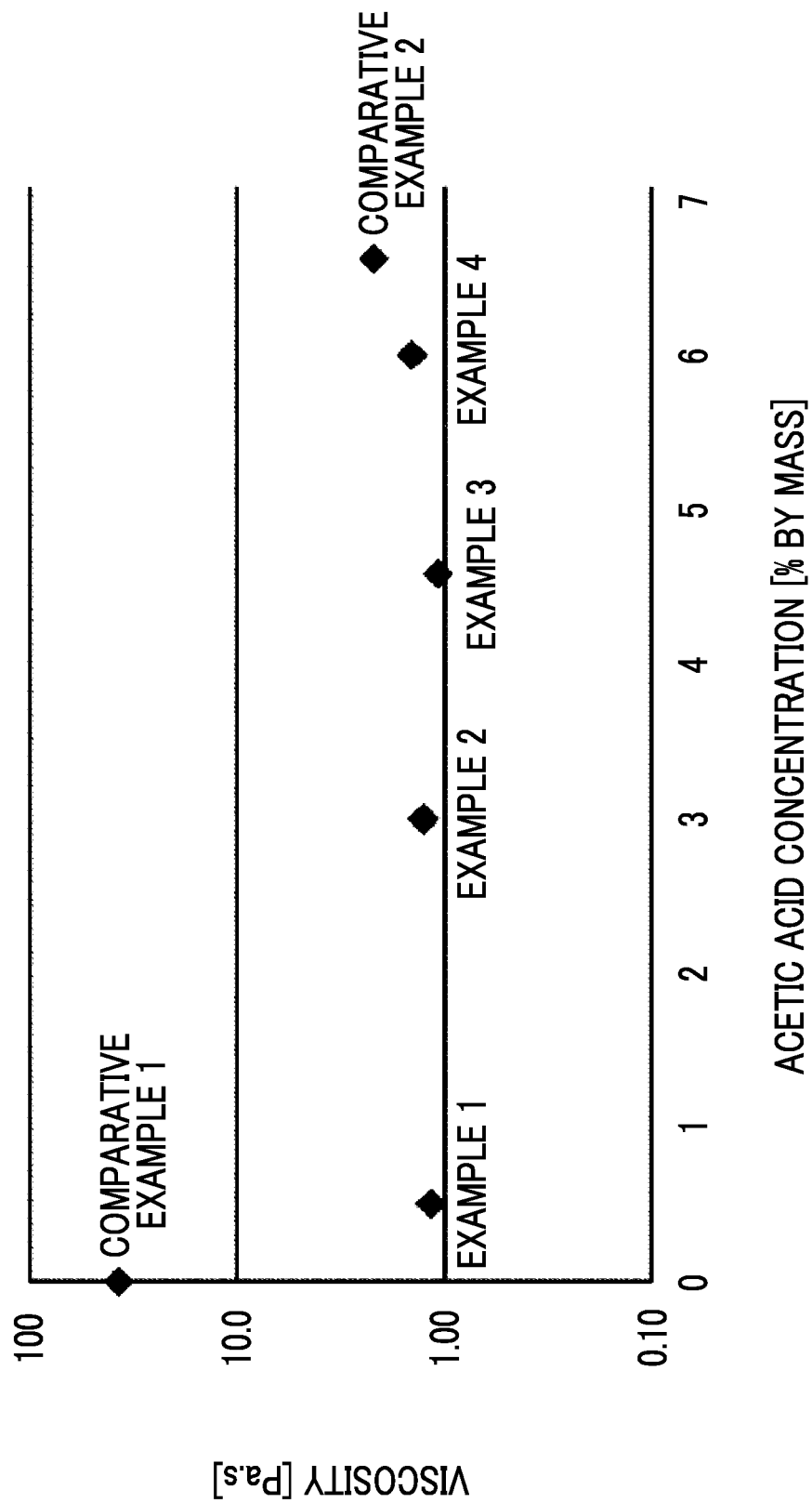
FIG. 2 is a diagram showing a correlation between an acetic acid concentration in a precursor solution and the viscosity of the precursor solution, the precursor solution being obtained by producing methods of Examples 1 to 4 and Comparative Examples 1 and 2.

In addition, FIG. 2 shows a plot of the relation between the acetic acid concentration in each precursor solution and the viscosity of the precursor solution.

<Evaluation of Absorption Characteristics of ITO Particles>

The toluene dispersion liquids of ITO particles obtained by the producing method of Examples 1 to 4 and Comparative Example 2 were diluted with toluene to a concentration of solid contents of approximately 0.0025%, and absorption characteristics were measured using an optical cell having an optical path length of 1 cm.

The measurement was performed using an UV-VIS-NIR spectrophotometer V-670 manufactured by JASCO Corporation.

The absorption peak center wavelengths ($\lambda p$) of the obtained ITO particles are also shown in Table 1.

<Production and Evaluation of Curable Composition>

36 µL (microliter) of DISPERBYK-106 manufactured by BYK Japan KK was added, as a dispersant, to the toluene dispersion liquid (ITO particles content: 420 mg) of ITO particles obtained by the producing method of Examples 1 to 4 and Comparative Example 2, and 533 µL of 1,6-hexanediol diacrylate was further added thereto as a polymerizable compound, and the mixture was stirred and mixed with a hot stirrer at 40° C. for 1 hour to obtain a mixed solution. (second step in the method for producing a curable composition)

The toluene solvent was removed from the obtained mixed solution using an evaporator to obtain a curable composition containing ITO particles in which the ITO particles were dispersed in an acrylate compound as a polymerizable compound. The obtained curable composition containing ITO particles was evaluated using a refractometer DR-M2 manufactured by ATAGO CO., LTD.

That is, using the toluene dispersion liquid of ITO particles in Examples and Comparative Example, the curable composition including ITO particles was prepared according to the above-described method, and the refractive index and Abbe number of the curable composition were evaluated.

In a case of a specimen having a strong plasmon resonance in the near infrared region, a sample in which the curable composition was diluted to approximately 0.01% by mass was prepared, and the absorption characteristics were measured.

The Abbe number is an index indicating the wavelength dispersion of the refractive index in the visible light region.

The Abbe number ($v_d$) is a value calculated by Equation 1.

$$\text{Abbe number } v_d = (n_d - 1)/(n_f - n_c) \quad \text{Equation 1}$$

In Equation 1, $n_d$ represents a refractive index for the D line (wavelength of 587.6 nm), $n_f$ represents a refractive index for the F line (wavelength of 486.1 nm), and $n_c$ represents a refractive index for the C line (wavelength of 656.3 nm), respectively.

The C line, D line, and F line are the C line, D line, and F line in the Fraunhofer line. The evaluation results are also shown in Table 1.

On the other hand, the precursor solution obtained in Comparative Example 2 has a viscosity of 0.22 Pa·s, which exhibits a slight increase in viscosity, but the dropwise addition in the step (II) can be performed. However, in the ITO particles formed using the cloudy precursor solution, the absorption peak center wavelength is shifted to the long wavelength side compared to the ITO particles obtained by the producing method of Examples. In addition, the Abbe number of the curable composition including the ITO particles is also higher than that of the curable composition obtained in Examples.

EXPLANATION OF REFERENCES

10: reactor
12: reaction vessel
14: cooling pipe
16: Dean Stark trap
18: glass beads

What is claimed is:

1. A method for producing indium tin oxide particles, the method comprising:
    a step of obtaining a precursor solution including indium and tin by heating indium acetate and tin acetate in a solvent including a carboxylic acid and having 6 to 20 carbon atoms; and
    a step of obtaining a reaction solution including indium tin oxide particles by dropwise adding the obtained precursor solution to a solvent having a hydroxy group and having 14 to 22 carbon atoms, which has a temperature of 230° C. to 320° C.,
    wherein an acetic acid concentration in the precursor solution is in a range of 0.5% by mass to 6% by mass; and
    wherein, in the step of obtaining a reaction solution including the indium tin oxide particles, the precursor solution is added dropwise at a dropping rate of 1.0 mL/min or more.

2. The method for producing indium tin oxide particles according to claim 1,
    wherein a viscosity of the precursor solution at 25° C. is 0.14 Pa·s or less.

3. The method for producing indium tin oxide particles according to claim 1,
    wherein a total molar concentration of metals included in the precursor solution is 0.1 mmol/mL or more.

4. The method for producing indium tin oxide particles according to claim 1,

TABLE 1

| | Precursor solution | | | ITO particles Absorption peak | Curable compound | |
|---|---|---|---|---|---|---|
| | Amount of acetic acid removed [mL] | Acetic acid concentration [% by mass] | Viscosity [Pa · s] | center wavelength λp [nm] | $n_d$ (587.6 nm) | Abbe number $v_d$ |
| Comparative Example 1 | All amount | 0 | 4.00 | — | — | — |
| Example 1 | 13 | 0.5 | 0.115 | 1745 | 1.4942 | 16 |
| Example 2 | 8.9 | 3 | 0.125 | 1751 | 1.494 | 16.1 |
| Example 3 | 6.3 | 4.5 | 0.11 | 1748 | 1.4942 | 16.4 |
| Example 4 | 3.8 | 6 | 0.14 | 1750 | 1.4945 | 16.6 |
| Comparative Example 2 | 2.9 | 6.5 | 0.22 | 1830 | 1.494 | 18.2 |

From the results shown in Table 1, in the precursor solution obtained by the producing method of Examples, it is understood that the viscosity is maintained in an appropriate range and the dropping property is good. In addition, since the absorption peak center wavelength of the ITO particles formed by the producing method of each example using each precursor solution is 1800 nm or less, and the curable composition including the ITO particles has an Abbe number ($v_d$) of 17 or less, it is understood that the wavelength dispersion is large.

Since the curable composition has a low Abbe number, it can be expected that a cured product of the curable composition also has a low Abbe number.

Therefore, in a case where the curable composition obtained by the producing method of Examples is used as a diffraction grating, the height of the diffraction grating can be lowered, and it is possible to significantly reduce the occurrence of flare. Therefore, the ITO particles and curable composition obtained by the producing method according to the embodiment of the present disclosure can be suitably used for various uses such as an optical material.

wherein, in a case where a content of the hydroxy group included in the solvent having a hydroxy group and having 14 to 22 carbon atoms is denoted by A mol, and a content of the carboxylic acid included in the precursor solution and having 6 to 20 carbon atoms is denoted by B mol, A and B satisfy a condition of Expression (I), $$B/(A+B)<0.5 \qquad \text{Expression (I).}$$

5. The method for producing indium tin oxide particles according to claim 1,
wherein the carboxylic acid having 6 to 20 carbon atoms includes oleic acid.

6. The method for producing indium tin oxide particles according to claim 1,
wherein the solvent having a hydroxy group and having 14 to 22 carbon atoms includes oleyl alcohol.

7. A method for producing a curable composition, the method comprising:

a step of obtaining indium tin oxide particles by the method for producing indium tin oxide particles according to claim 1; and a step of obtaining a curable composition having absorption in a near infrared region by mixing the obtained indium tin oxide particles and a polymerizable compound.

8. The method for producing indium tin oxide particles according to claim 1,
wherein the solvent having a hydroxy group and having 14 to 22 carbon atoms has a temperature of 280° C. to 320° C.

9. The method for producing indium tin oxide particles according to claim 1,
wherein the acetic acid concentration in the precursor solution is in a range of 1.0% by mass to 6% by mass.

* * * * *